(12) United States Patent
Hayashi et al.

(10) Patent No.: US 9,855,691 B2
(45) Date of Patent: Jan. 2, 2018

(54) RTM MOLDING DEVICE, RTM MOLDING METHOD, AND SEMI-MOLDED BODY

(75) Inventors: Noriya Hayashi, Tokyo (JP); Masayuki Kanemasu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 210 days.

(21) Appl. No.: 13/989,931

(22) PCT Filed: Feb. 17, 2012

(86) PCT No.: PCT/JP2012/053798
§ 371 (c)(1),
(2), (4) Date: May 28, 2013

(87) PCT Pub. No.: WO2012/117869
PCT Pub. Date: Sep. 7, 2012

(65) Prior Publication Data
US 2013/0280483 A1 Oct. 24, 2013

(30) Foreign Application Priority Data
Feb. 28, 2011 (JP) ................. 2011-043185

(51) Int. Cl.
*B29C 45/02* (2006.01)
*B32B 3/26* (2006.01)
(Continued)

(52) U.S. Cl.
CPC .............. *B29C 45/02* (2013.01); *B29C 70/48* (2013.01); *B29C 70/546* (2013.01);
(Continued)

(58) Field of Classification Search
CPC ...... B29C 70/547; B29C 70/548; B29C 70/48
(Continued)

(56) References Cited

U.S. PATENT DOCUMENTS 5,439,635 A * 8/1995 Seemann ............... 264/510
2003/0025231 A1 2/2003 Slaughter et al.
(Continued)

FOREIGN PATENT DOCUMENTS

DE 691 18 374 10/1996
DE 199 22 850 8/2000
(Continued)

OTHER PUBLICATIONS

Notice of Allowance dated Jul. 2, 2014 in Canadian patent application No. 2819121.
(Continued)

*Primary Examiner* — Alison L Hindenlang
*Assistant Examiner* — Mohamed K Ahmed Ali
(74) *Attorney, Agent, or Firm* — Wenderoth, Lind & Ponack, L.L.P.

(57) ABSTRACT

An RTM molding device and an RTM molding method which enable resin impregnation of even large members and thick members without causing non-impregnated regions or fiber wrinkle, and yield a molded body having superior toughness and excellent precision. In the RTM molding device, a surface molding layer, which is disposed between a fiber-reinforced base material and a molding die, has a plurality of through-holes formed therein, and has sufficient rigidity that the thickness does not substantially change under the pressure inside the cavity when the inside of the cavity is placed under reduced pressure, and a resin diffusion portion, which is located on the side of the surface molding layer opposite the fiber-reinforced base material, and comprises a resin flow path formed so as to connect with the plurality of through-holes of the surface molding layer, are provided on at least one surface of the fiber-reinforced base material.

10 Claims, 5 Drawing Sheets

(51) Int. Cl.
*B29C 70/48* (2006.01)
*B29C 70/54* (2006.01)

(52) U.S. Cl.
CPC ............ *B29C 70/548* (2013.01); *B32B 3/266* (2013.01); *Y10T 428/24322* (2015.01)

(58) Field of Classification Search
USPC .......................... 428/137; 264/571; 425/546
See application file for complete search history.

(56) References Cited

U.S. PATENT DOCUMENTS

| | | | |
|---|---|---|---|
| 2003/0025232 | A1 | 2/2003 | Slaughter et al. |
| 2004/0032062 | A1 | 2/2004 | Slaughter et al. |
| 2005/0040553 | A1 | 2/2005 | Slaughter et al. |
| 2006/0125155 | A1* | 6/2006 | Sekido et al. ................. 264/511 |
| 2008/0093761 | A1 | 4/2008 | Hansen |
| 2008/0128938 | A1 | 6/2008 | Boutefeu et al. |
| 2008/0277053 | A1* | 11/2008 | Stiesdal ............... B29C 70/342 156/245 |
| 2009/0115112 | A1 | 5/2009 | Liebmann |
| 2009/0184437 | A1 | 7/2009 | Hayashi et al. |
| 2010/0098906 | A1* | 4/2010 | Bongiovanni ...... B29C 37/0064 428/138 |
| 2013/0207293 | A1 | 8/2013 | Sekido et al. |
| 2013/0207316 | A1 | 8/2013 | Sekido et al. |
| 2013/0228956 | A1 | 9/2013 | Sekido et al. |

FOREIGN PATENT DOCUMENTS

| | | |
|---|---|---|
| JP | 2001-260155 | 9/2001 |
| JP | 2004-181627 | 7/2004 |
| JP | 2005-246902 | 9/2005 |
| JP | 2008-36997 | 2/2008 |
| JP | 2008-179149 | 8/2008 |
| JP | 2008-290441 | 12/2008 |
| JP | 2009-214386 | 9/2009 |
| RU | 2 217 312 | 11/2003 |
| RU | 97 086 | 8/2010 |
| WO | 02/18120 | 3/2002 |
| WO | 2006/058540 | 6/2006 |
| WO | 2006/058541 | 6/2006 |

OTHER PUBLICATIONS

Decision to Grant a Patent dated Jan. 6, 2015 in corresponding Japanese patent application No. 2011-043185.
Decision to Grant a Patent dated Jan. 12, 2015 in corresponding Russian patent application No. 2013123130 (with English translation).
International Search Report dated Apr. 24, 2012 in International (PCT) Application No. PCT/JP2012/053798.
Notification of the Decision to Grant a Patent Right for Invention dated Mar. 29, 2016 in Chinese patent application No. 201280003928.4.
Extended European Search Report dated Jan. 3, 2017 in corresponding European patent application No. 12 752 819.8.

* cited by examiner

RTM MOLDING DEVICE, RTM MOLDING METHOD, AND SEMI-MOLDED BODY

TECHNICAL FIELD

The present invention relates to an RTM molding device and RTM molding method for impregnating a fiber-reinforced base material with a resin and performing RTM molding, and also relates to a semi-molded body.

BACKGROUND ART

Composite materials such as fiber-reinforced plastics (FRP) are lightweight and very strong, and are therefore widely used as structural members for aircraft, automobiles, and ships and the like. One example of a molding method for composite materials is the resin transfer molding (RTM) method. The RTM molding method is a molding method that involves placing a fiber-reinforced base material inside a male/female pair of molding dies, fastening the dies and evacuating the inside of the dies to a state of reduced pressure, and then injecting a resin into the inside of the dies through a resin injection port, thereby impregnating the fiber-reinforced base material with the resin:

As illustrated in FIG. 9, in a typical RTM molding method, the resin is injected from a resin injection line 2 provided at one end of the device, flows through the inside of a fiber-reinforced base material 11 in an in-plane direction, and is discharged from a suction line 3 provided at the opposite end of the device. In the RTM molding method, because the resin flows through the inside of the fiber-reinforced base material, low viscosity and high fluidity are essential characteristics for the resin.

The RTM method offers the advantage that molding can be performed with an extremely high level of shape precision. However, in the RTM molding method described above, because the resin is impregnated from one end of the fiber-reinforced base material through to the opposite end, if the member is increased in size and/or thickness, problems may arise, including the resin impregnation requiring a very long period of time, and the occurrence of non-impregnated regions. If the injection pressure is increased in order to raise the resin injection rate with the aim of shortening the impregnation time, then pressure loss increases, and there is a possibility that this may cause wrinkling of the fibers.

In order to address the problems mentioned above, methods such as those illustrated in FIG. 10 and FIG. 11 have been proposed, in which the resin impregnation is performed through the thickness direction. FIG. 10 is a method in which a plurality of injection ports are positioned in the upper die, and the resin is supplied to the fiber-reinforced base material through these ports, thereby impregnating the fiber-reinforced base material in the thickness direction. FIG. 11 is a method in which a porous plate 41 and an intermediate member 40 are placed on top of the fiber-reinforced base material, and impregnation is performed in the thickness direction across substantially the entire surface of the fiber-reinforced base material. A perforated resin film or the like is used as the intermediate member 40.

DISCLOSURE OF INVENTION

In the method in which a plurality of injection ports are provided, such as the method illustrated in FIG. 10, optimizing the locations of the injection ports requires a great deal of effort, and using the method for members of even greater size or members of greater thickness is problematic. Further, following mold release, the molding dies are generally cleaned and reused, and providing a plurality of injection ports makes cleaning a time-consuming process.

In the method in which an intermediate member 40 is provided, such as the method illustrated in FIG. 11, because the intermediate member 40 lacks rigidity, when the region inside the dies is placed under vacuum, the intermediate member 40 deforms and acts as a damper, making it difficult to ensure good dimensional (thickness) precision for the molded product.

Furthermore, structural members for aircraft and the like require a high degree of toughness. It is generally said that the resin viscosity correlates with the toughness of the molded body. In other words, the toughness of a resin molded body formed by impregnating a fiber-reinforced base material with a resin for which the viscosity has been lowered by reducing the molecular weight or the like is lower than the toughness of a molded body formed using a resin of high viscosity with a large molecular weight. Accordingly, it is desirable that the fiber-reinforced base material is impregnated with a resin of high viscosity.

The present invention has been developed in light of these circumstances, and has an object of providing an RTM molding device and RTM molding method which enable resin impregnation of even large members and thick members without causing non-impregnated regions or fiber wrinkle, and yield a molded body having superior toughness and excellent precision, as well as providing a semi-molded body that can be used in the RTM molding device.

In order to achieve the above object, the present invention provides an RTM molding device comprising a molding die inside which a cavity is formed, and a resin injection line and a suction line that are connected to the cavity, the device configured such that a fiber-reinforced base material is placed in the cavity, the pressure inside the cavity is reduced, and a resin composition is injected into the cavity to impregnate the fiber-reinforced base material and form a molded body, wherein a surface molding layer, which is disposed between the fiber-reinforced base material and the molding die, has a plurality of through-holes formed therein, and has sufficient rigidity that the thickness does not substantially change under the pressure inside the cavity when the inside of the cavity is placed under reduced pressure, and a resin diffusion portion, which is located on the side of the surface molding layer opposite the fiber-reinforced base material, and comprises a resin flow path formed so as to connect with the plurality of through-holes of the surface molding layer, are provided on at least one surface of the fiber-reinforced base material.

In one aspect of the invention described above, the diameter of the through-holes in the surface molding layer is preferably not more than a predetermined value that ensures that the shape of the through-holes is not transferred to the molded body under the pressure that exists when the inside of the cavity is placed under reduced pressure.

In one aspect of the invention described above, it is preferable that the resin diffusion portion is provided on at least one surface of the fiber-reinforced base material, on the side from which the resin is injected or the side from which the resin is discharged, and when the resin diffusion portion is provided on the side of the fiber-reinforced base material from which the resin is injected, the resin flow path is connected to the resin injection line, whereas when the resin diffusion portion is provided on the side of the fiber-reinforced base material from which the resin is discharged, the resin flow path is connected to the suction line.

By providing a resin diffusion portion of the configuration described above, an open region through which the resin injected into the cavity can rapidly diffuse in the in-plane direction can be maintained. As a result, the resin can be supplied across the entire surface of the fiber-reinforced base material, and impregnates the base material in the thickness direction. Further, by providing the surface molding layer and the resin diffusion portion on the resin discharge side of the fiber-reinforced base material, the resin can be discharged across the entire surface of the fiber-reinforced base material. As a result, the fiber-reinforced base material can be impregnated with the resin composition in a short period of time, in a more uniform manner, and without wrinkling of the fibers.

In the surface molding layer that contacts the fiber-reinforced base material, the through-holes are formed with a size that ensures that the hole shape is not transferred to the fiber-reinforced base material, and therefore the surface of the molded body can be formed as a smooth surface having no unevenness. The surface molding layer has sufficient rigidity that the thickness does not substantially change under the pressure inside the cavity during resin injection. As a result, the rigid porous member does not act as a damper during the step of impregnating the fiber-reinforced base material with the resin, and therefore superior precision in the thickness of the molded body can be achieved. The expression that "the thickness does not substantially change" includes those cases where the thickness changes by an amount within a range permitted by the dimensional precision required for the molded body. For example, in the case of primary structural members for aircraft, a dimensional precision of not more than approximately ±0.1 mm is sometimes required.

In one aspect of the invention described above, the resin diffusion portion may be composed of at least one resin diffusion layer, which has a plurality of through-holes formed therein, the through-holes having a larger diameter than the through-holes formed in the adjacent layer on the side of the fiber-reinforced base material, has sufficient rigidity that the thickness does not substantially change under the aforementioned pressure, and is disposed between the surface molding layer and the molding die, wherein the through-holes formed in each layer connect with the through-holes formed in the adjacent layer to form a resin flow path.

By forming the resin diffusion portion as a resin diffusion layer, the fiber-reinforced base material can be impregnated with the resin composition without requiring processing of the molding die, and with the impregnation performed in a short period of time, in a more uniform manner, and without wrinkling of the fibers.

The resin diffusion layer has sufficient rigidity that the thickness does not substantially change under the pressure inside the cavity during resin injection. As a result, the rigid porous member does not act as a damper during the step of impregnating the fiber-reinforced base material with the resin, and therefore superior precision in the thickness of the molded body can be achieved.

Because the through-holes formed in the resin diffusion layer are larger than the through-holes formed in the layer positioned on the side of the fiber-reinforced base material, the injected resin diffuses rapidly.

Because the holes formed in the resin diffusion layer narrow in a stepwise manner in the direction of the surface molding layer, one layer can be prevented from falling into the hole of another layer.

In one aspect of the invention described above, the resin diffusion layer is preferably a porous plate formed from a punched metal. Further, in another aspect of the invention described above, the surface molding layer is preferably a porous plate formed from a punched metal.

Because punched metal is inexpensive, it can be used and discarded. As a result, cleaning of the molding dies following mold release is simplified. Further, punched metal exhibits greater rigidity than perforated films or the like, and therefore the thickness of the punched metal does not substantially change under the pressure inside the cavity.

In one aspect of the invention described above, the diameter of the through-holes formed in the surface molding layer is preferably not less than 0.3 mm and not more than 2 mm.

The hole diameter is preferably not less than 0.3 mm and not more than 2 mm, and more preferably not less than 0.5 mm and not more than 1 mm. If the hole diameter is too large, then, depending on the conditions, the rigidity of the fibers may succumb, resulting in bending of the fibers and an increased possibility that the shape of the holes may be transferred to the surface of the molded body. If the hole diameter is too small, then, depending on the conditions, the flow of the resin composition may be impaired.

In one aspect of the invention described above, the through-holes formed in the surface molding layer and the resin diffusion layer are preferably formed with a different shape from the through-holes formed in an adjacent layer. Further, in another aspect of the invention described above, the through-holes formed in the surface molding layer and the resin diffusion layer are preferably formed with the phase offset relative to the through-holes formed in an adjacent layer.

This ensures that when the layers are stacked together, there is not a complete overlap between the holes formed in the respective adjacent layers, and therefore the resin flow path can be formed more reliably.

In one aspect of the invention described above, the resin diffusion portion may comprise a channel formed in the surface of the molding die on the side of the fiber-reinforced base material, wherein this channel is connected to the resin injection line and the through-holes of the adjacent layer, thus forming a resin flow path. Further, in another aspect of the invention described above, the resin diffusion portion may comprise a channel formed in the surface of the molding die on the side of the fiber-reinforced base material, wherein this channel is connected to the suction line and the through-holes of the adjacent layer, thus forming a resin flow path.

By adopting the configuration described above, the channel functions as a resin flow path, and can support the diffusion of the resin in the in-plane direction. In consideration of the cleaning performed following mold release, the channel is preferably V-shaped.

Furthermore, the present invention also provides an RTM molding method in which a fiber-reinforced base material is placed in a cavity formed inside a molding die, the pressure inside the cavity is reduced, and a resin composition is injected into the cavity to impregnate the fiber-reinforced base material and form a molded body, wherein the method comprises a step of disposing, on the fiber-reinforced base material placed in the cavity, a surface molding layer having a plurality of through-holes formed therein, and having sufficient rigidity that the thickness does not substantially change under the pressure inside the cavity when the inside of the cavity is placed under reduced pressure, and a step of providing a resin diffusion portion, comprising a resin flow path, on the side of the surface molding layer opposite the fiber-reinforced base material so that the resin flow path connects with the though-holes of the surface molding layer.

In one aspect of the invention described above, the diameter of the through-holes in the surface molding layer is preferably not more than a predetermined value that ensures that the shape of the through-holes is not transferred to the molded body under the pressure that exists when the inside of the cavity is placed under reduced pressure.

In the invention described above, in the case where the resin diffusion portion and the surface molding layer having sufficient rigidity that the thickness does not substantially change under the pressure inside the cavity are provided on the resin supply side, diffusion of the resin composition enables the resin composition to be supplied across substantially the entire surface of the fiber-reinforced base material to impregnate the base material in the thickness direction. As a result, a high-quality molded body can be formed in a short period of time, without generating non-impregnated regions or fiber wrinkle. Further, because a high-viscosity resin composition having increased toughness can be used, a molded body of superior toughness can be molded.

In the case where the resin diffusion portion and the surface molding layer are provided on the resin discharge side, the resin composition can be discharged across substantially the entire surface of the fiber-reinforced base material. As a result, the fiber-reinforced base material can be impregnated with the resin composition in a short period of time, in a more uniform manner, and without wrinkling of the fibers.

In the step of providing the resin diffusion portion, at least one resin diffusion layer having a plurality of through-holes formed therein, the through-holes having a larger diameter than the through-holes formed in the adjacent layer on the side of the fiber-reinforced base material, and having sufficient rigidity that the thickness does not substantially change under the aforementioned pressure, may be provided as the resin dispersion portion between the surface molding layer and the molding die, so that the through-holes formed in each layer connect with the through-holes formed in the adjacent layer to form a resin flow path.

By forming the resin diffusion portion as a resin diffusion layer, the fiber-reinforced base material can be impregnated with the resin composition without requiring processing of the molding die, and with the impregnation performed in a short period of time, in a more uniform manner, and without wrinkling of the fibers.

In one aspect of the invention described above, the resin diffusion layer is preferably a porous plate formed from a punched metal. Further, in another aspect of the invention described above, the surface molding layer is preferably a porous plate formed from a punched metal.

By using a punched metal, a molded body having superior dimensional precision can be molded easily and inexpensively.

In one aspect of the invention described above, the diameter of the through-holes formed in the surface molding layer is preferably not less than 0.3 mm and not more than 2 mm.

The hole diameter is preferably not less than 0.3 mm and not more than 2 mm, and more preferably not less than 0.5 mm and not more than 1 mm. By restricting the hole diameter in this manner, transfer of the hole shape to the molded body can be more reliably prevented.

In one aspect of the invention described above, in the step of providing the resin diffusion portion, layers in which mutually different shaped through-holes have been formed are preferably disposed adjacent to one another. Further, in another aspect of the invention described above, in the step of providing the resin diffusion portion, layers in which the through-holes have been formed with different phases are preferably disposed adjacent to one another.

This ensures that when the layers are stacked together, there is not a complete overlap between the holes formed in the respective adjacent layers, and therefore the resin flow path can be formed more reliably.

In one aspect of the invention described above, in the step of providing the resin diffusion portion, a channel that connects to the resin injection line and the through-holes of the adjacent layer may be formed in the surface of the molding die on the side of the fiber-reinforced base material. Further, in another aspect of the invention described above, in the step of providing the resin diffusion portion, a channel that connects to the suction line and the through-holes of the adjacent layer may be formed in the surface of the molding die on the side of the fiber-reinforced base material.

By using the method described above, the channel functions as a resin flow path, and can support the diffusion of the resin in the in-plane direction. In consideration of the cleaning performed following mold release, the channel is preferably V-shaped.

Further, the present invention also provides a semi-molded body which is used in an RTM molding device comprising a molding die inside which a cavity is formed, and a resin injection line and a suction line that are connected to the cavity, the device configured such that a fiber-reinforced base material is placed in the cavity, the pressure inside the cavity is reduced, and a resin composition is injected into the cavity to impregnate the fiber-reinforced base material and form a molded body, wherein the semi-molded body comprises, on either one surface or both surfaces of the fiber-reinforced base material, a surface molding layer having a plurality of through-holes formed therein and having sufficient rigidity that the thickness does not substantially change under the pressure inside the cavity when the inside of the cavity is placed under reduced pressure, and a resin diffusion portion which is located on the side of the surface molding layer opposite the fiber-reinforced base material and comprises a resin flow path formed so as to connect with the plurality of through-holes of the surface molding layer.

In one aspect of the invention described above, the diameter of the through-holes in the surface molding layer is preferably not more than a predetermined value that ensures that the shape of the through-holes is not transferred to the molded body under the pressure that exists inside the cavity when the inside of the cavity is placed under reduced pressure.

According to the invention described above, because the fiber-reinforced base material is disposed on a member having good rigidity, deformation or damage during transport or the like can be prevented.

According to the present invention, by diffusing the resin composition using the surface molding layer and the resin diffusion portion, supplying or discharging the resin composition across substantially the entire surface of the fiber-reinforced base material, and performing impregnation of the base material in the thickness direction, a molded body with superior dimensional precision can be molded in a short period of time, without generating non-impregnated regions or fiber wrinkle or the like, even for large members and thick plate members. Further, because a high-viscosity resin composition having increased toughness can be used, a structural member of superior toughness can be molded. A molded body formed in this manner can be used as a primary member for an aircraft.

BEST MODE FOR CARRYING OUT THE INVENTION

First Embodiment

In this embodiment, an RTM molding device and RTM molding method for molding a flat plate-shaped structural member are described.

Figure 1:
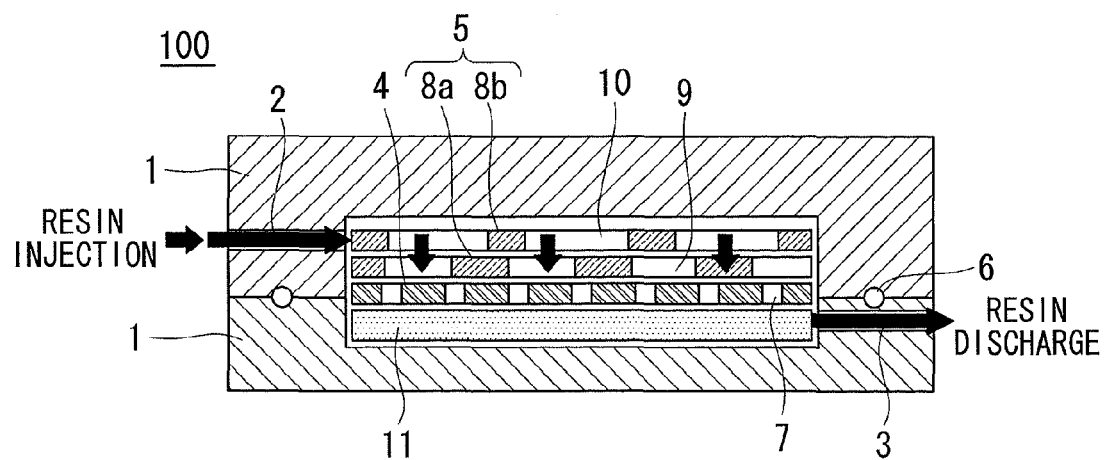
FIG. 1 A cross-sectional view of an RTM molding device according to a first embodiment.

FIG. 1 illustrates a cross-sectional view of the RTM molding device 100 according to the present embodiment. The RTM molding device 100 according to this embodiment comprises a molding die 1, a resin injection line 2, a suction line 3, a surface molding layer 4, and a resin diffusion portion 5.

The molding die 1 is composed of an upper die and a lower die. Joining the upper die to the lower die forms an internal cavity. A sealing member 6 is provided at the interface between the upper die and the lower die so that when the upper die and the lower die are joined together, the inside of the cavity is tightly sealed.

The resin injection line 2 and the suction line 3 are provided in connection with the inside of the cavity. In FIG. 1, one end of the resin injection line 2 is positioned at the upper portion of one end face of the inside of the cavity, and one end of the suction line 3 is positioned at the lower portion of the other end face of the inside of the cavity.

The surface molding layer 4 has a plurality of holes 7 that pass through the layer in the thickness direction. The hole diameter of the holes 7 is sufficiently small to ensure that the shape of the holes in the surface molding layer 4 is not transferred to the surface of the molded body, and is preferably not less than 0.3 mm and not more than 2 mm, and more preferably not less than 0.5 mm and not more than 1 mm. The hole opening rate is preferably set, for example, to a value of not more than 51%. The shape of the holes 7 may be selected as appropriate, and may be circular, oval, square, hexagonal or rectangular or the like. The arrangement of the holes 7 may be a staggered array or a lattice arrangement or the like, and may also be selected as appropriate.

The surface molding layer 4 is formed from a material having sufficient rigidity that the thickness of the layer does not substantially change even when pressure is applied inside the cavity during resin impregnation. The surface molding layer 4 preferably uses a punched metal formed from stainless steel, aluminum, iron or copper or the like. The thickness of the surface molding layer 4 is typically from approximately 0.2 mm to 3 mm, preferably from 0.3 mm to 2 mm, and more preferably from 0.5 mm to 1 mm.

In the present embodiment, the resin diffusion portion 5 is formed from a resin diffusion layer 8, which in FIG. 1 is composed of two stacked resin diffusion layers 8a and 8b.

The lower resin diffusion layer 8a is stacked on the surface molding layer 4. A plurality of holes 9 that pass through the layer in the thickness direction are formed in the lower resin diffusion layer 8a. The hole diameter of the holes 9 is set to a larger diameter than the holes 7 formed in the surface molding layer 4. The hole opening rate of the lower resin diffusion layer 8a is preferably higher than the hole opening rate of the surface molding layer 4, with larger hole opening ratios being more advantageous during resin impregnation. When determining the dimensions of the holes 9, an important consideration is ensuring that the surface molding layer 4 does not fall into the holes 9 of the lower resin diffusion layer 8a during molding. For example, a good balance relative to the rigidity of the surface molding layer 4 must be achieved on the basis of the short diameter or short side length in the case of oval or rectangular holes, or the diameter or diagonal length in the case of circular or hexagonal holes. Accordingly, based on these hole dimension restrictions, there is a limit to the hole opening rate of the lower resin diffusion layer 8a.

The shape of the holes 9 may be circular, oval, square, hexagonal or rectangular or the like, and is preferably selected so that the shape of the holes 9 differs from the shape of the holes formed in the surface molding layer 4. The arrangement of the holes 9 may be a staggered array or a lattice arrangement or the like, and may be selected as appropriate, but in order to ensure a phase difference relative to the holes 7 formed in the surface molding layer 4, the holes 9 are preferably arranged differently from the holes of the surface molding layer 4.

The lower resin diffusion layer 8a is formed from a material that undergoes substantially no change in thickness even when pressure is applied inside the cavity during resin impregnation. The lower resin diffusion layer 8a preferably uses a punched metal formed from stainless steel, aluminum, iron or copper or the like. The hole opening rate of the lower resin diffusion layer 8a is typically from approximately 10% to 60%, as such materials are readily available, but innovations such as making the shape of the holes rectangular enable even higher hole opening rates to be achieved. The thickness of the punched metal is preferably from approximately 1 mm to 4 mm.

The upper resin diffusion layer 8b is stacked on top of the lower resin diffusion layer 8a. In FIG. 1, the upper resin diffusion layer 8b is disposed so that one surface (the upper surface) contacts the upper mold, enabling resin to be injected directly into the upper resin diffusion layer 8b from the resin supply line. A plurality of holes 10 that pass through the layer in the thickness direction are formed in the upper resin diffusion layer 8b. The hole diameter of the holes 10 is set to a larger diameter than the holes 9 formed in the lower resin diffusion layer 8a. The hole opening rate of the upper resin diffusion layer 8b is higher than the hole opening rate of the lower resin diffusion layer 8a. The shape of the holes 10 may be circular, oval, square, hexagonal or rectangular or the like, and is preferably selected so that the shape of the holes 10 differs from the shape of the holes 9 formed in the lower resin diffusion layer 8a. The arrangement of the holes 10 may be a staggered array or a lattice arrangement or the like, and may be selected as appropriate, but in order to ensure a phase difference relative to the holes 9 formed in the lower resin diffusion layer 8a, the holes 10 are preferably arranged differently from the holes of the lower resin diffusion layer 8a.

The upper resin diffusion layer 8b is formed from a material that undergoes substantially no change in thickness even when pressure is applied inside the cavity during resin impregnation. The upper resin diffusion layer 8b preferably uses a punched metal formed from stainless steel, aluminum, iron or copper or the like. The thickness of the upper resin diffusion layer 8b is preferably from approximately 1 mm to 4 mm.

Figure 2:
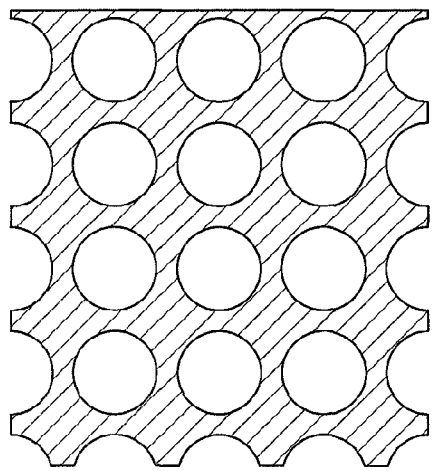
FIG. 2 A top view illustrating one example of a punched metal.
Figure 3:
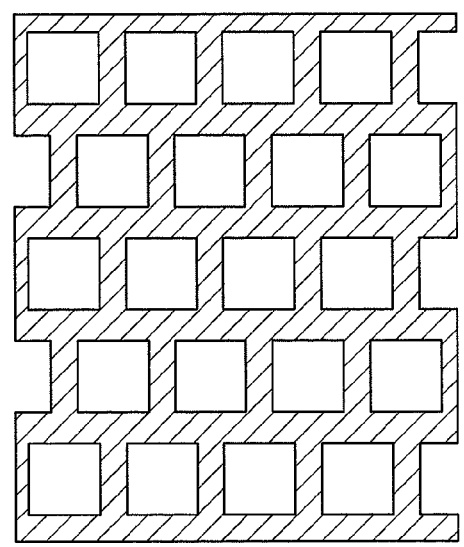
FIG. 3 A top view illustrating one example of a punched metal.
Figure 4:
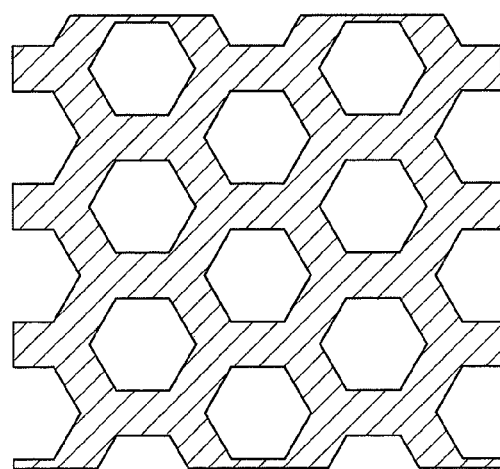
FIG. 4 A top view illustrating one example of a punched metal.

FIG. 2 to FIG. 4 are examples of the punched metal used for the surface molding layer 4 or the resin diffusion layer 8. As illustrated in FIG. 2 to FIG. 4, the punched metal has not been trimmed.

In the surface molding layer 4 and the resin diffusion layer 8 having the configurations described above, the holes 7, 9 and 10 formed in each of the layers overlap and are connected to the holes 7, 9 and 10 formed in the other layers, thus forming a resin flow path through which the resin can flow in the thickness direction and the in-plane direction.

Next is a description of the RTM molding method according to the present embodiment.

The reinforcing fiber used in the present embodiment is carbon fiber, glass fiber, aramid fiber, metal fiber, boron fiber, alumina fiber, or silicon carbide high-strength synthetic fiber or the like. Carbon fiber is particularly desirable. There are no particular limitations on the form of the fiber-reinforced base material 11, and a unidirectional sheet or woven fabric or the like can be employed. A plurality of layers of such a material are typically stacked to form the base material, and if necessary, a semi-molded body that has been shaped in advance may be used. In this case, the semi-molded body may be prepared by performing shape formation with the fiber-reinforced base material 11 positioned on top of a rigid porous member formed from the surface molding layer 4 and the resin diffusion layer 8. Further, a semi-molded body may also be formed by performing shape formation with the fiber-reinforced base material 11 sandwiched between two rigid porous members. The resulting semi-molded body may then be supplied to the RTM molding device 100.

In the present embodiment, a resin injection molding (RIM) monomer or the like that forms a thermosetting resin or thermoplastic resin is typically used as the resin. Examples of the thermosetting resin include epoxy resins, unsaturated polyester resins, polyvinyl ester resins, phenolic resins, guanamine resins, polyimide resins such as bismaleimide-triazine resins, furan resins, polyurethane resins, poly(diallyl phthalate) resins, melamine resins, urea resins and amino resins.

Further, resins prepared by blending a plurality of materials selected from among thermosetting resins, thermoplastic resins and rubbers can also be used.

In the RTM molding method according to the present embodiment, first, the fiber-reinforced base material 11 is placed inside the cavity of the lower die. The surface molding layer 4, the lower resin diffusion layer 8a and the upper resin diffusion layer 8b are then stacked sequentially on top of the fiber-reinforced base material 11. At this time, the holes 7, 9 and 10 within each of the adjacent layers interconnect to form a resin flow path. Subsequently, the upper mold is fastened to the lower mold. A release cloth (peel ply) may be inserted between the fiber-reinforced base material 11 and surface molding layer 4. Next, suction is applied from the suction line 3, and the inside of the cavity is placed under reduced pressure. The resin is then injected under pressure through the resin injection line 2 and into the upper resin diffusion layer 8b inside the cavity.

Figure 5:
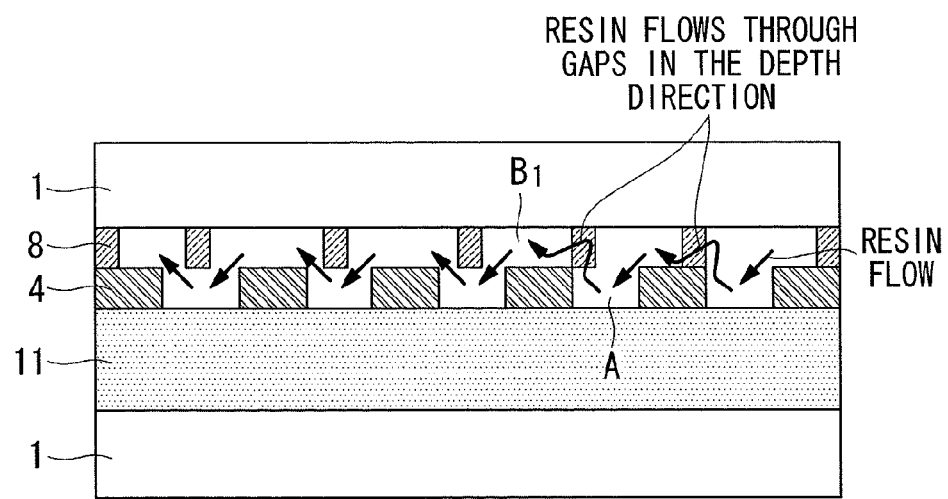
FIG. 5 A cross-sectional view explaining the flow of resin.

The injected resin passes through the resin flow path and diffuses in both the in-plane direction and the thickness direction. FIG. 5 is a cross-sectional view explaining the flow of resin. For the sake of simplicity, the resin diffusion layer 8 is illustrated as a single layer. In FIG. 5, the resin flow threads its way through the holes formed in the upper and lower layers (the resin diffusion layer 8 and the surface molding layer 4). Because the sizes of the holes formed in the upper and lower layers differ, any hole formed in one layer may be connected to two or more holes formed in another layer. Even in the case where, within a single cross-section, a hole A and a hole $B_1$ in vertically adjacent layers are not interconnected, the hole A will be connected with a hole $B_2$ (not shown in the figure) within another cross-section (for example, in the depth direction of FIG. 5), and therefore the resin can still flow along the in-plane direction via the hole $B_2$. If layers having holes of different shapes are positioned adjacent to one another, then a more reliable resin flow path can be formed. Furthermore, if layers that have been perforated with different hole arrangements are positioned adjacent to one another, then a more reliable resin flow path can be formed.

The resin that has diffused through the resin flow path is supplied from the holes 7 formed in the surface molding layer 4 to substantially the entire surface of the fiber-reinforced base material 11, and penetrates through the fiber-reinforced base material 11 in the thickness direction. At this time, surplus resin is discharged from the suction line 3. Once the entire fiber-reinforced base material 11 has been impregnated with the resin, suction is stopped. Subsequently, the inside of the cavity is held at or above a predetermined pressure (for example, one atmosphere (101, 325 Pa)), and the resin is cured. In those cases where a punched metal is used as the surface molding layer 4 and the resin diffusion layer 8, the punched metal may be discarded following release of the molded body. This simplifies cleaning of the molding dies following mold release.

Figure 9:
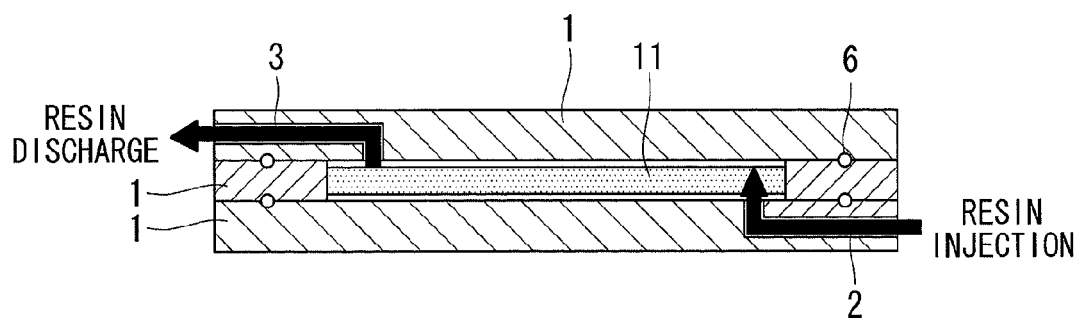
FIG. 9 A cross-sectional view of a conventional RTM molding device.
Figure 10:
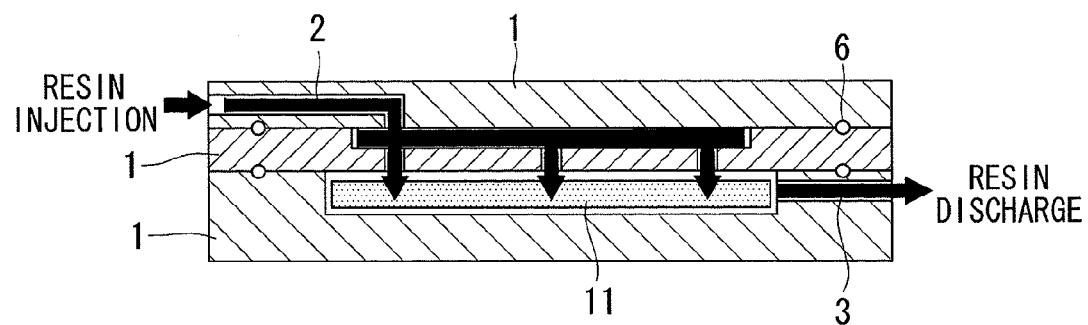
FIG. 10 A cross-sectional view of a conventional RTM molding device.
Figure 11:
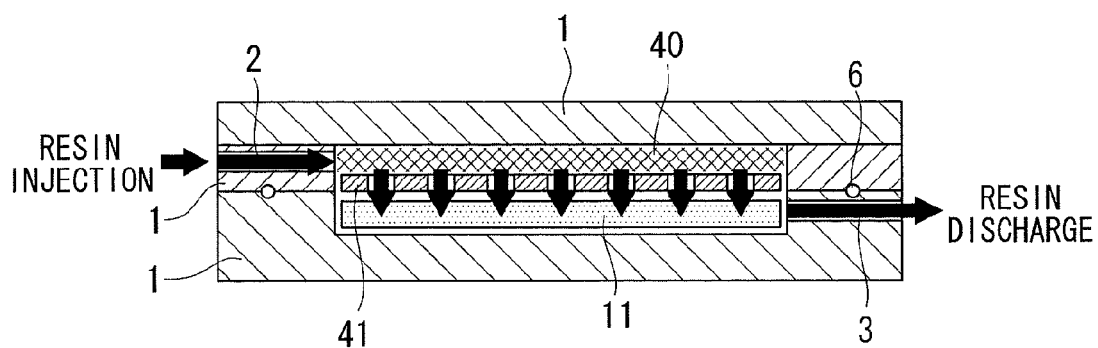
FIG. 11 A cross-sectional view of a conventional RTM molding device.

When the present embodiment was used to mold a flat plate-shaped structural member having dimensions of 180 mm×150 mm×plate thickness 25 mm, the fiber-reinforced base material was able to be impregnated with the resin in approximately 10 minutes. When the same flat plate-shaped structural member was molded using a conventional method in which resin impregnation was performed from one end of the fiber-reinforced base material, such as the method shown in FIG. 9, approximately 35 minutes were required to impregnate the fiber-reinforced base material with resin. On the basis of these results it was evident that the present embodiment enables the fiber-reinforced base material resin to be impregnated with resin in a short period of time.

Second Embodiment

Figure 6:
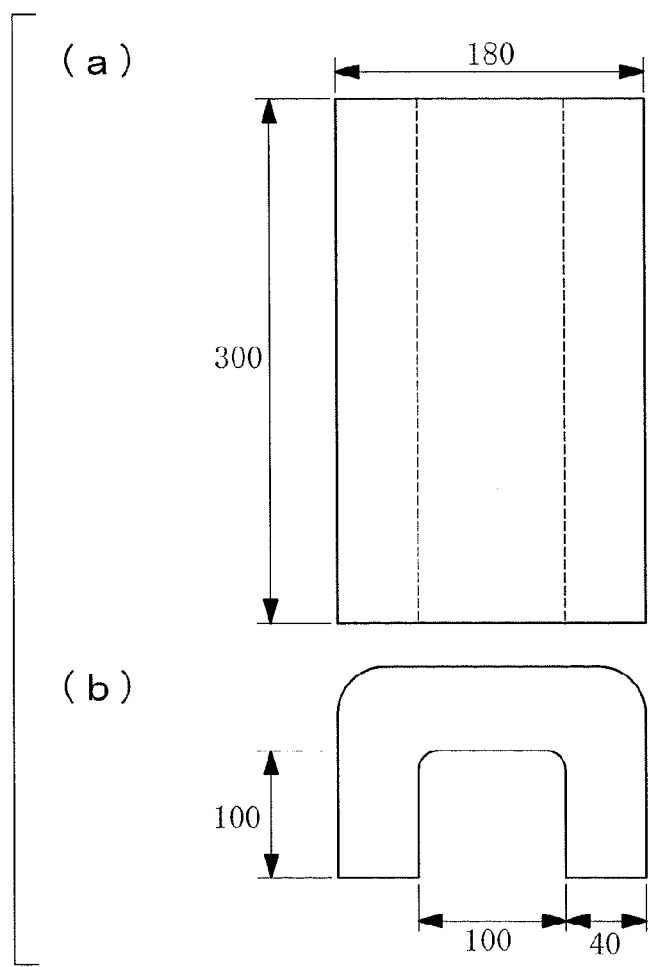
FIG. 6 A diagram illustrating one example of a C-shaped structural member.

In this embodiment, the shape of the molded body is a C-shape. One example of a C-shaped structural member is illustrated in FIG. 6. FIG. 6(a) is a top view, and FIG. 6(b) is a cross-sectional view. In FIG. 6, the size of the C-shaped structural member is 300 mm×180 mm×plate thickness 40 mm, and the size of the concave recess is 100 mm×100 mm.

Figure 7:
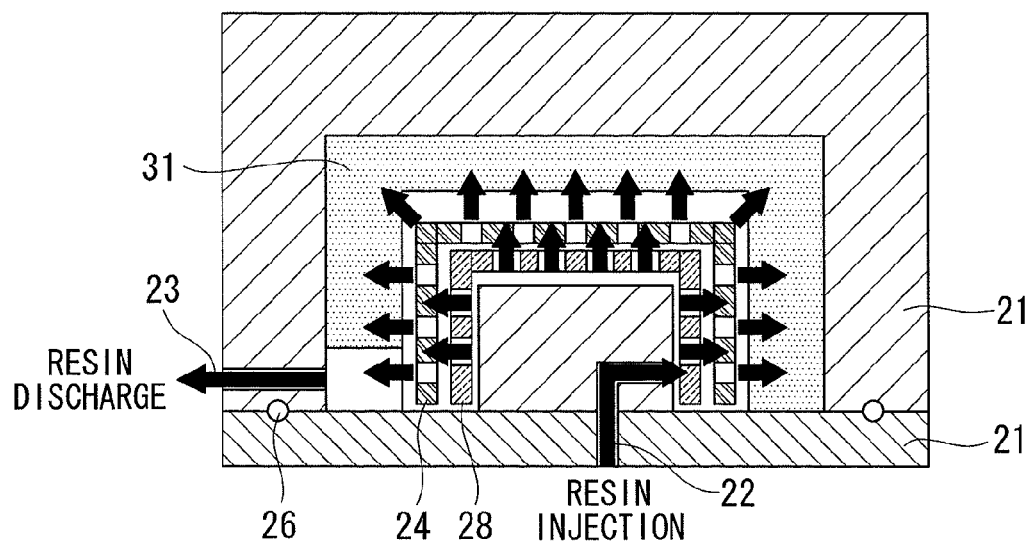
FIG. 7 A cross-sectional view of an RTM molding device according to a second embodiment.

FIG. 7 illustrates a cross-sectional view of an RTM molding device 200 used for molding the C-shaped structural member illustrated in FIG. 6. In a similar manner to the first embodiment, the RTM molding device 200 comprises a molding die 21, a resin injection line 22, a suction line 23, a surface molding layer 24 and a resin diffusion portion.

The molding die 21 is composed of an upper die and a lower die. Joining the upper die to the lower die forms an internal cavity. A sealing member 26 is provided at the interface between the upper die and the lower die so that when the upper die and the lower die are joined together, the inside of the cavity is tightly sealed.

The resin injection line 22 and the suction line 23 are provided in connection with the inside of the cavity. In FIG. 7, one end of the resin injection line 22 is positioned at one end face of the inside of the C-shaped cavity, and one end of the suction line 23 is positioned at the other end face of the inside of the C-shaped cavity.

The surface molding layer 24 is the same as that of the first embodiment.

The resin diffusion portion is composed of a single resin diffusion layer 28, and a channel (not shown in the figure) which is formed in the surface of the molding die that contacts the resin diffusion layer 28. In some cases, the resin diffusion layer 28 may be omitted.

The resin diffusion layer 28 is the same as the upper resin diffusion layer 8b of the first embodiment. In this embodiment, because the shape of the molded body that is formed is a C-shape, the thickness of the resin diffusion layer (punched metal) 28 is preferably from 1 mm to 4 mm. This enables the layer to conform to the R value.

The channel formed in the molding die is a linear channel that connects to the resin injection line 22. The linear channel is preferably V-shaped (triangular). This facilitates cleaning following mold release. The location for the formation of the linear channel may be determined as appropriate.

Next is a description of the RTM molding method according to the present embodiment. A fiber-reinforced base material 31 is placed inside the cavity, and the surface molding layer 24 and the resin diffusion layer 28 are then stacked sequentially on top of the base material. At this time, the channel formed in the molding die connects with the holes formed in the resin diffusion layer 28, and the holes in the surface molding layer 24 connect with the holes in the resin diffusion layer 28, thus forming a resin flow path. A release cloth (peel ply) may be inserted between the fiber-reinforced base material 31 and surface molding layer 24. Suction is applied from the suction line 23 to reduce the pressure inside the cavity, and the resin is injected under pressure through the resin injection line 22.

The resin injected under pressure into the cavity from the resin injection line 22 enters the resin diffusion layer 28, and also passes through the linear channel and diffuses in an in-plane direction through the resin diffusion layer 28 that contacts the molding die 21. As a result, the resin can diffuse rapidly into the surface molding layer 24 even when only a single resin diffusion layer 28 is provided.

The resin passes through the resin flow path, and diffuses in both the in-plane direction and the thickness direction. The resin is supplied from the plurality of holes formed in the surface molding layer 24 to substantially the entire surface of the fiber-reinforced base material 31, and penetrates through the fiber-reinforced base material 31 in the thickness direction. At this time, surplus resin is discharged from the suction line 23. Once the entire fiber-reinforced base material 31 has been impregnated with the resin, suction is stopped. Subsequently, the inside of the cavity is held at a predetermined pressure, and the resin is cured to form a molded body.

Figure 8:
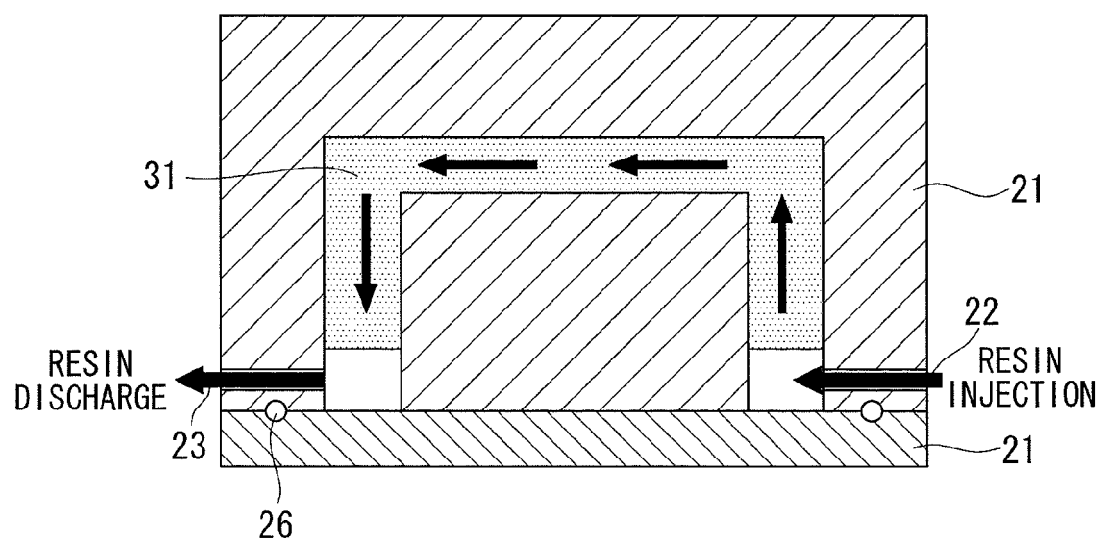
FIG. 8 A cross-sectional view of a conventional RTM molding device.

In the first embodiment and the second embodiment, by providing the surface molding layer and the resin diffusion portion, the resin that is injected under pressure into the inside of the cavity diffuses, and can be supplied across substantially the entire surface of the fiber-reinforced base material. Further, because the resin flows through the fiber-reinforced base material in the thickness direction, the distance that the resin passes through the fiber-reinforced base material is shorter than the distance in a conventional method (FIG. 8). As a result, even when a high-viscosity resin is used, the fiber-reinforced base material can be impregnated with the resin without causing fiber wrinkle or the like. Further, even if the thickness of the molded body is approximately 40 mm, the fiber-reinforced base material can be impregnated with the resin in a short period of time, without leaving any non-impregnated regions. During molding, the surface molding layer is pressed against the fiber-reinforced base material, but by reducing the size of the holes formed in the surface molding layer, the shape of the holes in the surface molding layer can be prevented from transferring to the surface of the molded body. The surface molding layer and the resin diffusion layer have sufficient rigidity that they no not deform under the pressure inside the cavity during molding. As a result, even when the surface molding layer and the resin diffusion layer are interposed between the molding die and the fiber-reinforced base material, a molded body having high dimensional (thickness) precision can be obtained.

In the first embodiment and the second embodiment, the surface molding layer and the resin diffusion portion were provided on the resin injection side of the fiber-reinforced base material, but there are no particular limitations on the locations for the surface molding layer and the resin diffusion portion. The surface molding layer and the resin diffusion portion may also be provided on the resin discharge side of the fiber-reinforced base material, or may be provided on both the resin injection side and the resin discharge side.

According to the RTM molding device of the structure described above, by adjusting the number of resin diffusion layers and the thickness of those layers, the same molding die can be used to mold molded bodies of different thicknesses. In other words, a minor change in the thickness does not require preparation of a new molding die. Further, a semi-molded body prepared by subjecting a rigid porous member and a fiber-reinforced base material to shape formation can also be used. This type of semi-molded body can prevent damage and deformation during transport.

EXPLANATION OF REFERENCE 1, 21: Molding die
2, 22: Resin injection line
3, 23: Suction line
4, 24: Surface molding layer
5: Resin diffusion portion
6, 26: Sealing member
7, 9, 10: Hole
8, 8a, 8b: Resin diffusion layer
11, 31: Fiber-reinforced base material
40: Intermediate member
41: Porous plate
100, 200: RTM molding device

The invention claimed is:

1. An RTM molding device including:
a molding die inside of which a cavity is formed; and
a resin injection line and a suction line that are connected to the cavity,
the device being configured such that a fiber-reinforced base material is placed in the cavity, pressure inside the cavity is reduced, and a resin composition is injected into the cavity to impregnate the fiber-reinforced base material and form a molded body, wherein the RTM molding device further comprises:
a surface molding layer for molding a surface and being disposed between the fiber-reinforced base material and the molding die, the surface molding layer having a plurality of through-holes formed therein, and having sufficient rigidity so that thickness does not substantially change under a pressure inside the cavity when the inside of the cavity is placed under reduced pressure; and
resin diffusion means located on a side of the surface molding layer opposite the fiber-reinforced base material, the resin diffusion means defining a resin flow path connecting with the plurality of through-holes of the surface molding layer and allowing the resin composition to pass therethrough,
wherein the surface molding layer and the resin diffusion means are configured to be provided on at least one surface of the fiber-reinforced base material,
wherein the resin diffusion means is composed of at least a first resin diffusion layer, which has a plurality of through-holes formed therein, the through-holes having a larger diameter than the through-holes formed in the surface molding layer,
wherein the first resin diffusion layer has sufficient rigidity so that thickness does not substantially change under the pressure, and the first resin diffusion layer is disposed between the surface molding layer and the molding die,
wherein the through-holes formed in the first resin diffusion layer connect with two or more of the through-holes formed in the surface molding layer to form the resin flow path,
wherein the resin diffusion means is composed of a second resin diffusion layer disposed adjacent to the first resin diffusion layer, the second resin diffusion layer having a plurality of through-holes formed therein, and
wherein the through-holes formed in the surface molding layer and the first resin diffusion layer are formed with a different shape from through-holes formed in the second resin diffusion layer.

2. The RTM molding device according to claim 1, wherein a diameter of the through-holes in the surface molding layer is not more than a predetermined value that ensures that a shape of the through-holes is not transferred to the molded body under a pressure that exists when the inside of the cavity is placed under reduced pressure.

3. The RTM molding device according to claim 1, wherein
the resin diffusion means is provided on at least one surface of the fiber-reinforced base material, on a side from which the resin is injected or a side from which the resin is discharged, and
when the resin diffusion means is provided on the side of the fiber-reinforced base material from which the resin is injected, the resin flow path is connected to the resin injection line, whereas
when the resin diffusion means is provided on the side of the fiber-reinforced base material from which the resin is discharged, the resin flow path is connected to the suction line.

4. The RTM molding device according to claim 1, wherein the first resin diffusion layer is a porous plate formed from a punched metal.

5. The RTM molding device according to claim 1, wherein the surface molding layer is a porous plate formed from a punched metal.

6. The RTM molding device according to claim 1, wherein a diameter of the through-holes formed in the surface molding layer is not less than 0.3 mm and not more than 2 mm.

7. The RTM molding device according to claim 1, wherein the through-holes formed in the surface molding layer and the first resin diffusion layer are formed with a phase offset relative to through-holes formed in the second resin diffusion layer.

8. The RTM molding device according to claim 1, wherein the resin diffusion means further comprises a channel formed in a surface of the molding die on a side of the fiber-reinforced base material, and the channel is connected to the resin injection line and the through-holes of the second resin diffusion layer, thus forming the resin flow path.

9. The RTM molding device according to claim 1, wherein the resin diffusion means further comprises a channel formed in a surface of the molding die on a side of the fiber-reinforced base material, and the channel is connected to the suction line and the through-holes of the second resin diffusion layer, thus forming the resin flow path.

10. The RTM molding device according to claim 1, wherein the second resin diffusion layer is stacked on the first resin diffusion layer, and
wherein each of the through holes formed in the second resin diffusion layer has a larger diameter than the through-holes formed in the first resin diffusion layer.

* * * * *